(12) United States Patent
Suzuki

(10) Patent No.: US 9,643,494 B2
(45) Date of Patent: May 9, 2017

(54) FUEL CELL SYSTEM

(71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventor: Hiroyuki Suzuki, Aichi-ken (JP)

(73) Assignees: KABUSHIKI KAISHA TOYOTA JIDOSHOKKI, Kariya-shi Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 183 days.

(21) Appl. No.: 14/290,218

(22) Filed: May 29, 2014

(65) Prior Publication Data

US 2014/0356650 A1  Dec. 4, 2014

(30) Foreign Application Priority Data

May 30, 2013  (JP) ................................ 2013-114233

(51) Int. Cl.
*B60L 1/00* (2006.01)
*B60L 11/18* (2006.01)
(Continued)

(52) U.S. Cl.
CPC ............ *B60L 1/003* (2013.01); *B60L 11/1803* (2013.01); *B60L 11/1887* (2013.01); *B60L 15/20* (2013.01); *H01M 8/04097* (2013.01); *H01M 16/006* (2013.01); *B60L 2200/42* (2013.01); *B60L 2210/10* (2013.01); *B60L 2240/421* (2013.01); *B60L 2250/16* (2013.01); (Continued)

(58) Field of Classification Search
CPC ...................... H01M 8/04231; H01M 8/04955
See application file for complete search history.

(56) References Cited

U.S. PATENT DOCUMENTS

2006/0216555 A1\* 9/2006 Shige ................ H01M 8/04223
429/429
2011/0250516 A1\* 10/2011 Tsukada ............ H01M 8/04223
429/429

(Continued)

FOREIGN PATENT DOCUMENTS

JP         6-223859 A      8/1994
JP      2008-293708 A     12/2008
(Continued)

*Primary Examiner* — Jeremiah Smith
(74) *Attorney, Agent, or Firm* — Sughrue Mion, PLLC

(57) ABSTRACT

A fuel cell system includes a fuel cell which generates electrical energy by reacting a hydrogen gas from a hydrogen gas supply source and an oxidizing agent gas from an oxidizing agent gas supply source, a hydrogen circulating pump which is provided in a hydrogen circulation path and transfers hydrogen gas of the hydrogen circulation path to the fuel cell, and control means. When the supply of hydrogen gas from the hydrogen gas supply source to the fuel cell is discontinued, the control means discontinues the supply of oxidizing agent gas from the oxidizing agent gas supply source to the fuel cell and activates the hydrogen circulating pump such that electrical energy generated in the fuel cell is supplied to the hydrogen circulating pump.

3 Claims, 3 Drawing Sheets

(51) Int. Cl.
   *B60L 15/20*      (2006.01)
   *H01M 16/00*      (2006.01)
   *H01M 8/04089*    (2016.01)
   *H01M 8/04955*    (2016.01)
   *H01M 8/04223*    (2016.01)

(52) U.S. Cl.
   CPC .... *H01M 8/04223* (2013.01); *H01M 8/04231* (2013.01); *H01M 8/04955* (2013.01); *Y02T 10/645* (2013.01); *Y02T 10/7216* (2013.01); *Y02T 10/7275* (2013.01); *Y02T 90/34* (2013.01)

(56) References Cited

U.S. PATENT DOCUMENTS

2012/0077102 A1* 3/2012 Morita .............. H01M 8/04388
                                                    429/429
2012/0276465 A1* 11/2012 Paganelli .......... H01M 8/04097
                                                    429/429

FOREIGN PATENT DOCUMENTS

WO        2005/078844 A1   8/2005
WO     WO 2011/051340      *   5/2011  .............. H01M 8/04

* cited by examiner

FUEL CELL SYSTEM

BACKGROUND OF THE INVENTION

1. Field of the Invention

This invention relates to a fuel cell system.

2. Description of the Related Art

Fuel cell systems that use fuel cells as an energy supply source have been developed in recent years. In these fuel cell systems, a reducing agent gas such as hydrogen gas is supplied to the anodes of the fuel cells, an oxidizing agent gas such as air containing oxygen is supplied to the cathodes of the fuel cells, and electrical energy composed of direct current power is generated by allowing an oxidation-reduction reaction (electrochemical reaction) to proceed between the hydrogen and oxygen in the fuel cells. A technology is employed in some fuel cell systems for circulating hydrogen gas not used in the electrochemical reaction in the fuel cells and reusing that gas in the fuel cells.

In addition, in the fuel cell system of a vehicle, when normal operation consisting of the generation of electrical power by the fuel cell is stopped in a fuel cell system during idling at the time of the vehicle stopping or while the vehicle is operating under a light load, the fuel cell is not subjected to an electrical load and further takes on a high electrical potential condition in which the electrical potential becomes higher due to the presence of residual oxygen and hydrogen, and if this state is maintained, the durability of the catalyst in the fuel cell is reduced and the performance of the fuel cell decreases.

Consequently, Japanese Patent Application Laid-open No. 2008-293708, for example, describes controlling the cell voltage of a fuel cell under a low load such as no load so as to decrease it to a predetermined voltage by increasing the hydrogen supply pressure. As a result, the decrease in performance of the fuel cell under no load or idling load can be prevented.

In the fuel cell system described in Japanese Patent Application Laid-open No. 2008-293708, the hydrogen pressure of the hydrogen supplied from a hydrogen storage tank is increased when the cell voltage of the fuel cell is lowered under a low load such as no load. Further, the cell voltage is decreased as a result of generating electrical power with residual oxygen present in the fuel cell and the supplied hydrogen. Since the generated electrical power is surplus electrical power, it is stored in the electrical storage device provided in the fuel cell system.

However, a state may occur in which the capacity of the electrical storage device is full and the electrical power generated in the fuel cell can no longer be received therein. In such a state, the surplus electrical power has to be consumed by, for example, converting the electrical power generated in the fuel cell to thermal energy. Thus, the problem of energy loss occurs.

SUMMARY OF THE INVENTION

With the foregoing in view, an object of the present invention is to provide a fuel cell system that reduces energy loss when the electrical potential of a fuel cell decreases under conditions where normal electrical power generation is not carried out by the fuel cell.

In order to solve the above-mentioned problems, a fuel cell system according to the present invention comprises: a fuel cell generating electrical energy by reacting a hydrogen gas supplied from a hydrogen gas supply source and an oxidizing agent gas supplied from an oxidizing agent gas supply source; a hydrogen circulating pump provided in a hydrogen circulation path where hydrogen gas that has not been used in the fuel cell is recirculated to the fuel cell, the hydrogen circulating pump transferring hydrogen gas of the hydrogen circulation path to the fuel cell; and control means, wherein in the case where the supply of hydrogen gas from the hydrogen gas supply source to the fuel cell is discontinued, the control means discontinues the supply of oxidizing agent gas from the oxidizing agent gas supply source to the fuel cell and activates the hydrogen circulating pump such that the control means supplies electrical energy generated in the fuel cell to the hydrogen circulating pump.

DESCRIPTION OF THE EMBODIMENTS

The following provides an explanation of embodiments of the present invention based on the accompanying drawings.

First, an explanation is provided of the general configuration of a fuel cell system 101 according to an embodiment of the present invention and a vehicle equipped with the fuel cell system 101. Furthermore, in the present embodiment, the vehicle equipped with the fuel cell system 101 is explained using the example of a forklift 1.

Figure 1:
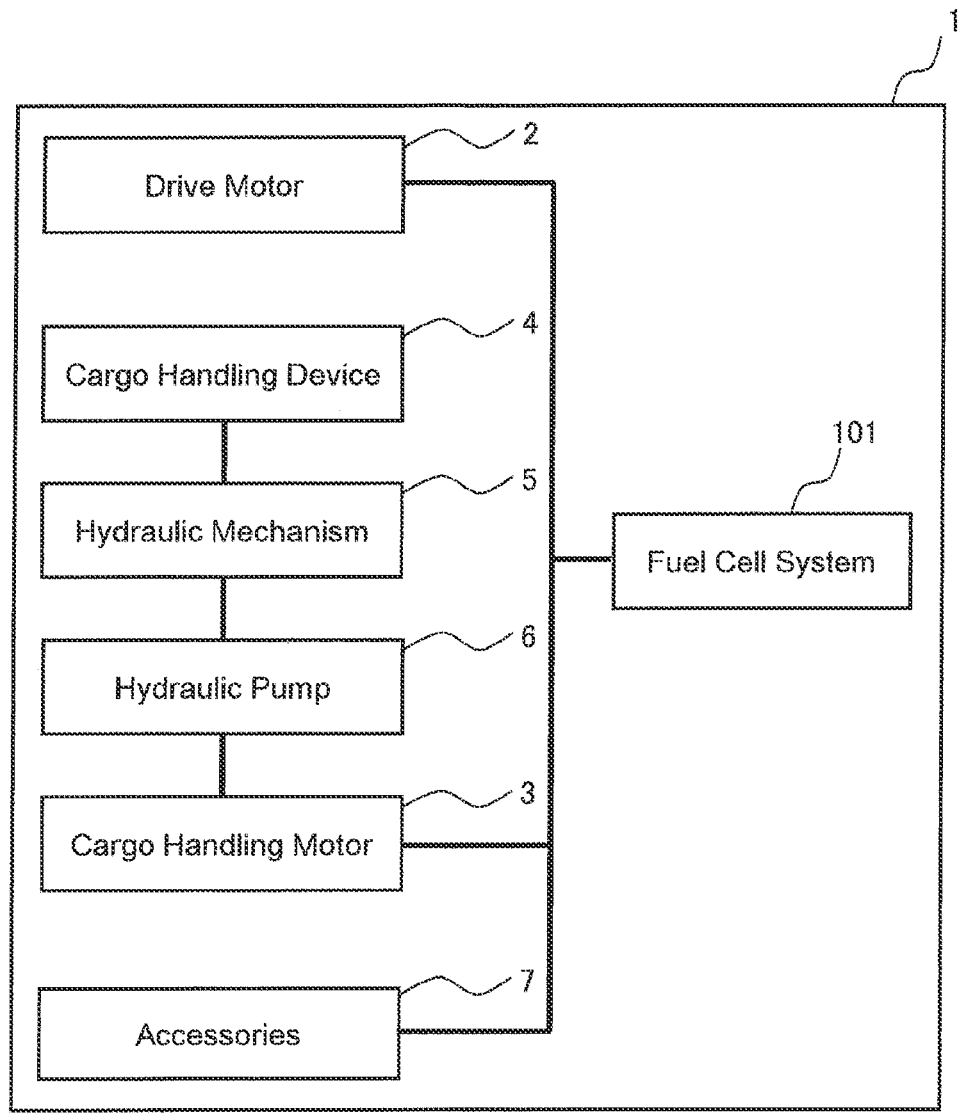
FIG. 1 is a drawing showing a schematic configuration of a forklift equipped with a fuel cell system according to an embodiment of the present invention.

With reference to FIG. 1, the forklift 1 includes: a drive motor 2 for implementing operations such as driving the forklift 1; a cargo handling motor 3 for driving a cargo handling device 4 such as a fork or mast for carrying out cargo handling; other accessories 7 (such as displays or lights) required for operating the forklift 1; and the fuel cell system 101. The cargo handling device 4 is operated by activating a hydraulic mechanism 5 which is activated by hydraulic pressure generated by a hydraulic pump 6 integrally connected rotatably to the cargo handling motor 3.

The drive motor 2, the cargo handling motor 3 and the accessories 7 operate by using electrical power generated by a fuel cell 10 (see FIG. 2) included in the fuel cell system 101. Further, the fuel cell 10 has a stack structure in which multiple polymer-type single cells are layered, and the fuel cell 10 is capable of generating high electrical power (electrical energy) from an electrochemical reaction between hydrogen and oxygen supplied to each cell.

Figure 2:
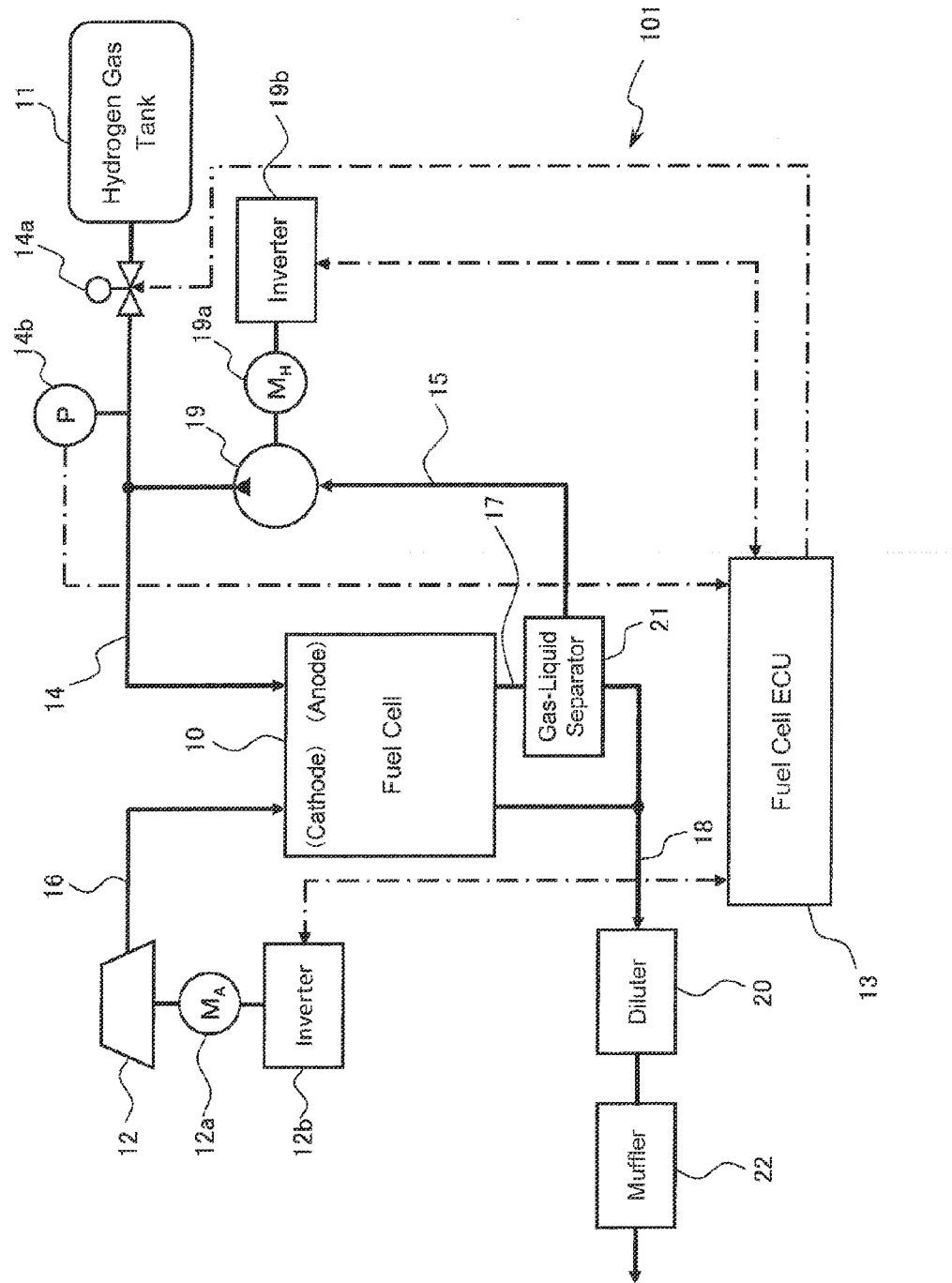
FIG. 2 is a drawing showing a schematic configuration of a device related to the power generating operation of a fuel cell in the fuel cell system according to the embodiment of the present invention.

With reference to FIG. 2, in addition to the fuel cell 10, the fuel cell system 101 also includes a hydrogen gas tank 11 for storing hydrogen gas (reducing agent gas) supplied to the fuel cell 10, a motordriven compressor 12 for transferring air containing oxygen (oxidizing agent gas) to the fuel cell 10, and a fuel cell ECU 13 that controls the operation of each device relating to the fuel cell system 101.

The compressor 12 has an integrally provided motor 12a and has an electrically-operated construction driven by the motor 12a. An air supply line 16 extends from the compressor 12 and is connected to the cathode side portion of the fuel cell 10. As a result, air compressed by the compressor 12 is supplied to the cathode of each cell in the fuel cell 10.

Further, the motor 12a of the compressor 12 is electrically connected to an inverter 12b, and the fuel cell ECU 13 controls operation (rotating speed) of the motor 12a by controlling the inverter 12b to adjust the supplied electrical power. More specifically, the fuel cell ECU 13 transmits a rotational speed command for the motor 12a to the inverter 12b, and then the inverter 12b supplies a control signal, namely electrical power, to the motor 12a so that the motor 12a operates at the commanded rotational speed. Moreover, the inverter 12b receives rotational speed information from a rotational speed sensor provided in the motor 12a, and transmits the received rotational speed information to the fuel cell ECU 13. The fuel cell ECU 13 then adjusts the rotational speed command to be transmitted to the inverter 12b based on the received rotational speed information.

Here, the hydrogen gas tank 11 constitutes a hydrogen gas supply source, the compressor 12 constitutes an oxidizing agent gas supply source, and the fuel cell ECU 13 constitutes a control means.

The hydrogen gas tank 11 is connected to the anode side portion of the fuel cell 10 through a hydrogen supply line 14. Hydrogen gas delivered from the hydrogen gas tank 11 is supplied to the anode of each cell in the fuel cell 10. Moreover, an electromagnetic hydrogen supply control valve 14a, which regulates the flow rate of hydrogen gas by opening or closing the hydrogen supply line 14, is provided at an intermediate point on the hydrogen supply line 14. The hydrogen supply control valve 14a is electrically connected to the fuel cell ECU 13 so as to have its operation controlled thereby. Also, the hydrogen supply control valve 14a may be provided at the connection between the hydrogen gas tank 11 and the hydrogen supply line 14.

In addition, an exhaust line 17 is provided from the anode side portion of the fuel cell 10 to a gas-liquid separator 21. A hydrogen circulation line 15, which constitutes a hydrogen circulation path for discharging gas containing hydrogen not used in the fuel cell 10 (discharged unreacted hydrogen), extends from the gas-liquid separator 21. The hydrogen circulation line 15 is connected to the hydrogen supply line 14 between the fuel cell 10 and the hydrogen supply control valve 14a. Moreover, a motordriven hydrogen circulating pump 19 for transferring gas containing hydrogen discharged from the fuel cell 10 to the hydrogen supply line 14 is provided at an intermediate point on the hydrogen circulation line 15. The gas-liquid separator 21 separates water (generated reaction water) which is generated during the reaction in the fuel cell 10 and is present in the gas containing hydrogen.

Furthermore, a motor 19a of the hydrogen circulating pump 19 is electrically connected to an inverter 19b. The fuel cell ECU 13 controls operation (rotating speed) of the motor 19a of the hydrogen circulating pump 19 by controlling the inverter 19b to adjust the supplied electrical power. Control of the inverter 19b by the fuel cell ECU 13 and control of the motor 19a by the inverter 19b are carried out in the same manner as control by the fuel cell ECU 13 and the inverter 12b in the compressor 12.

In addition, a pressure sensor 14b, which senses the pressure of hydrogen gas supplied from the hydrogen gas tank 11 to the hydrogen supply line 14, is provided on the hydrogen supply line 14 between the connection of the hydrogen circulation line 15 and the hydrogen supply control valve 14a. The pressure sensor 14b is electrically connected to the fuel cell ECU 13 so as to transmit sensed pressure information.

In addition, an exhaust line 18 for discharging air not used in the fuel cell 10 as well as water (generated reaction water) generated during the reaction in the fuel cell 10 extends from the cathode side portion of the fuel cell 10.

A diluter 20 and a muffler 22 are provided in an upstream to downstream orientation at an intermediate point on the exhaust line 18. Furthermore, a line, which includes a valve not shown, extends from the gas-liquid separator 21 to the diluter 20. Therefore, exhaust fumes on the anode side discharged from the gas-liquid separator 21 are discharged to the outside of the fuel cell system 101 after being diluted with exhaust fumes that contain a large amount of air and are discharged from the cathode side to the exhaust line 18.

Figure 3:
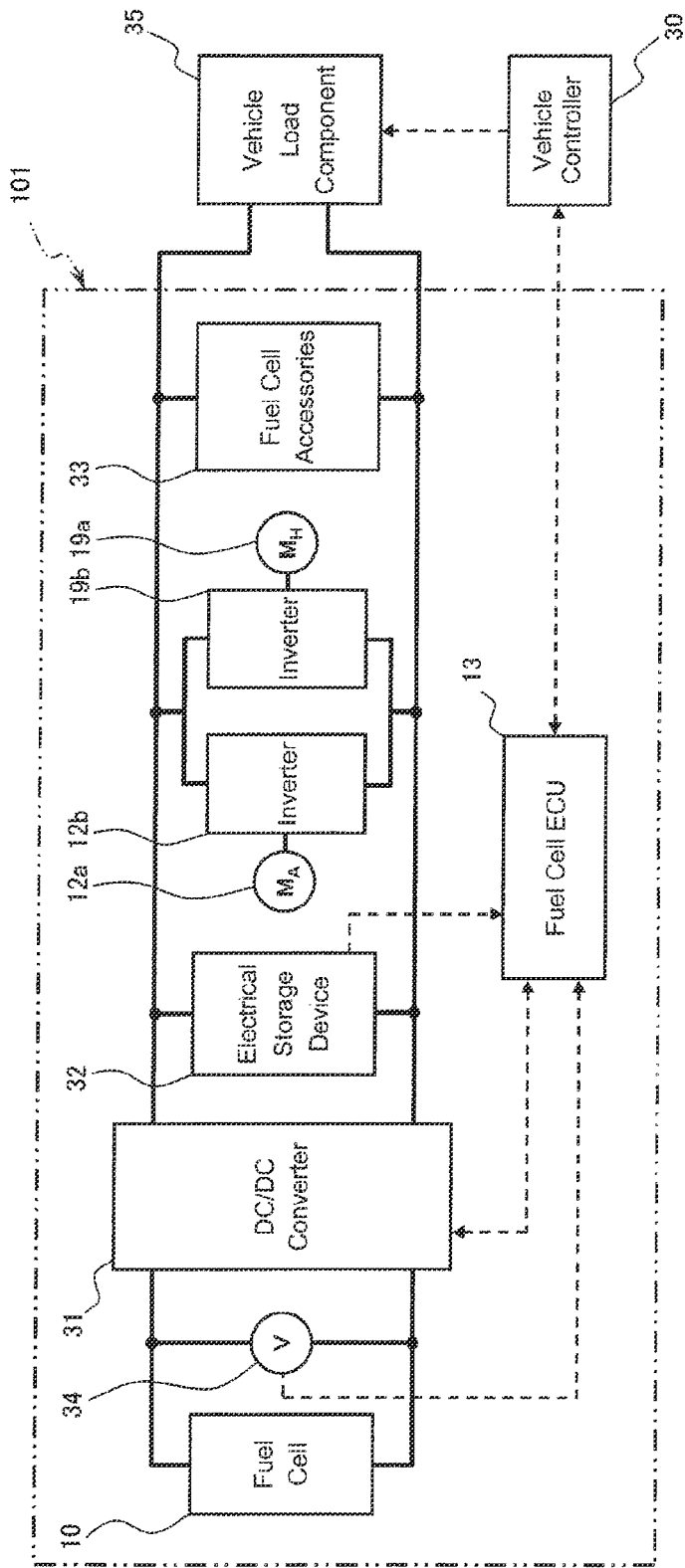
FIG. 3 is a drawing showing a schematic configuration of electrical components involved in electrical power generated by the fuel cell in the fuel cell system of FIG. 2.

Moreover, the configuration of electrical components in the fuel cell system 101 is shown with reference to FIG. 3.

In addition to the fuel cell 10, the fuel cell system 101 includes a converter (DC-DC converter) 31 for raising or lowering the voltage of electrical power generated by the fuel cell 10, an electrical storage device (such as an Li ion capacitor) 32 for storing electrical power generated by the fuel cell 10, the inverters 12b and 19b, fuel cell accessories 33 for operating the fuel cell system 101, and the fuel cell ECU 13.

The anode and cathode of the fuel cell 10 are electrically connected to the DC-DC converter 31 to supply electrical power generated by the fuel cell 10 thereto.

A voltmeter 34 is provided between the fuel cell 10 and the DC-DC converter 31. The voltmeter 34 is electrically connected to the fuel cell ECU 13 so as to sense the voltage of the cells of the fuel cell 10 (cell voltage) and transmit the sensed results thereto. Furthermore, the voltmeter 34 may be configured to sense the voltage of all cells of the fuel cell 10 or the voltage of only several of the all cells.

Moreover, the DC-DC converter 31, the electrical storage device 32, the inverters 12b and 19b, the fuel cell accessories 33 and a vehicle load component 35 are mutually connected electrically. Electrical power, the voltage of which has been raised or lowered by the DC-DC converter 31, is supplied to the electrical storage device 32, the inverters 12b and 19b, the fuel cell accessories 33 and the vehicle load component 35. The DC-DC converter 31 is electrically connected to the fuel cell ECU 13 so as to have its operation controlled thereby.

Furthermore, the vehicle load component 35 is configured as a unit that is located outside the fuel cell system 101 and includes the drive motor 2, the cargo handling motor 3, other accessories 7 required for operating the forklift 1, etc. (See FIG. 1) The vehicle load component 35 is configured so as to be controlled by a vehicle controller 30 that is separately located from the fuel cell system 101 and controls the entire forklift 1.

Moreover, the vehicle controller 30 is configured so as to transmit and receive commands and information between itself and the fuel cell ECU 13.

In addition, the fuel cell ECU 13 is configured so as to detect the electrical power storage rate of the electrical storage device 32, control operation of the fuel cell accessories 33, and control operation of the inverters 12b and 19b.

Next, an explanation is provided of the operation of the fuel cell system 101 and peripherals thereof according to this embodiment of the present invention.

First, an explanation is provided of the case of normal operation of the fuel cell 10.

With reference to FIGS. 1 to 3, in the case where generation of electrical power by the fuel cell 10 is required in order to activate the vehicle load component 35 for operating the forklift 1 such as the drive motor 2, the cargo handling motor 3, the accessories 7, etc., the fuel cell ECU 13 of the fuel cell system 101 causes the fuel cell 10 to operate normally in the manner described below.

Namely, the fuel cell ECU 13 supplies hydrogen gas from the hydrogen gas tank 11 to the fuel cell 10 by opening the hydrogen supply control valve 14a, and transfers air to the fuel cell 10 by activating the compressor 12 while using electrical power generated by the fuel cell 10 and/or electrical power in the electrical storage device 32. At the same time, the fuel cell ECU 13 activates the hydrogen circulating pump 19 by using electrical power in the electrical storage device 32, and circulates hydrogen gas not used in the fuel cell 10 through the hydrogen circulation line 15 to redeliver that gas to the fuel cell 10. In other words, the fuel cell ECU 13 causes the fuel cell 10 to operate normally by issuing a command for carrying out output performance of the fuel cell 10 to each device. At this time, the fuel cell ECU 13 adjusts the output of the fuel cell 10 (amount of electrical power generated) by regulating the opening of the hydrogen supply control valve 14a to adjust the flow rate of supplied hydrogen gas based on cell voltage of the fuel cell 10 received from the voltmeter 34 and the hydrogen gas pressure received from the pressure sensor 14b. The fuel cell ECU 13 then raises or lowers the voltage of the electrical power generated in the fuel cell 10 by means of the DC-DC converter 31, and supplies that electrical power to the vehicle load component 35, the inverters 12b and 19b, the fuel cell accessories 33 and the electrical storage device 32.

When, after completing cargo handling work of the forklift 1, the forklift 1 goes into an idling state and the vehicle load component 35 decreases so that electrical power generation by the fuel cell 10 is no longer required, the fuel cell ECU 13 discontinues the supply of hydrogen gas from the hydrogen gas tank 11 by closing the hydrogen supply control valve 14a. In this case, the fuel cell ECU 13 discontinues the supply of electrical power to the compressor 12 and the hydrogen circulating pump 19 to stop them. In other words, the fuel cell ECU 13 stops the normal operation of the fuel cell 10 by issuing a command for discontinuing output performance of the fuel cell 10 to each device.

The fuel cell ECU 13 then carries out control in the manner described below when the normal operation of the fuel cell 10 has been stopped.

While the normal operation of the fuel cell 10 is stopped by discontinuing the supply of hydrogen gas from the hydrogen gas tank 11, when the cell voltage of the fuel cell 10 received from the voltmeter 34 exceeds a predetermined voltage value, the fuel cell ECU 13 carries out recirculation of hydrogen gas to the fuel cell 10 by discontinuing the supply of electrical power to the compressor 12 and activating the hydrogen circulating pump 19 while closing the hydrogen supply control valve 14a.

At this time, oxygen contained in air remaining in the fuel cell 10 and hydrogen remaining in the fuel cell 10 and each of the lines 14 and 15 undergo an electrochemical reaction. As a result, oxygen remaining in the fuel cell 10 is consumed, and the electrical potential generated by oxygen and hydrogen in the fuel cell 10 decreases.

Furthermore, in the case where the cell voltage of the fuel cell 10 received from the voltmeter 34 exceeds the predetermined voltage value even when the electrical potential of the fuel cell 10 has been lowered by the above-mentioned action, the fuel cell ECU 13 attempts to further lower the electrical potential of the fuel cell 10 by slightly opening the hydrogen supply control valve 14a and supplying hydrogen to the fuel cell 10.

Electrical power is then generated by the fuel cell 10 as a result of the oxygen remaining in the fuel cell 10 and the hydrogen reacting. The fuel cell ECU 13 supplies the generated electrical power to the hydrogen circulating pump 19. As a result, electrical power generated in the fuel cell 10 is consumed by being used to activate the hydrogen circulating pump 19.

Further, in the case where electrical power generated by the residual oxygen and hydrogen in the fuel cell 10 is in excess of the electrical power required to operate the hydrogen circulating pump 19, when the electrical power storage rate of the electrical storage device 32 is equal to or less than a predetermined electrical power storage rate, the fuel cell ECU 13 supplies and stores the surplus electrical power into the electrical storage device 32.

On the other hand, when the electrical power storage rate of the electrical storage device 32 exceeds the predetermined electrical power storage rate (that is, the capacity thereof is full), the fuel cell ECU 13 supplies the surplus electrical power to the fuel cell accessories 33 or the accessories 7 of the vehicle load component 35.

As a result, while the normal operation of the fuel cell 10 is stopped, it is prevented from maintaining a state of high electrical potential that exceeds the predetermined voltage value. Moreover, since electrical power generated during the lowering of the electrical potential of the fuel cell 10 by consuming residual oxygen is used to activate the hydrogen circulating pump 19, wasteful expenditure of energy such as by discarding the electrical power is reduced. Moreover, in the case of further surplus electrical power, the surplus electrical power is used by storing it in the electrical storage device 32 or activating the fuel cell accessories 33 or the accessories 7 of the vehicle load component 35.

Also, the fuel cell ECU 13 may carryout control to store all of the electrical power, which is generated during lowering of the electrical potential of the fuel cell 10, into the electrical storage device 32 for the present, and further supply electrical power from the electrical storage device 32 to the hydrogen circulating pump 19.

Alternatively, when the electrical power storage rate of the electrical storage device 32 is equal to or less than the predetermined electrical power storage rate, the fuel cell ECU 13 may supply the electrical power, which is generated during lowering the electrical potential of the fuel cell 10, in parallel to both the electrical storage device 32 and the hydrogen circulating pump 19. Further, the ratio of electrical power supplied to the electrical storage device 32 and the hydrogen circulating pump 19 may be varied according to the electrical power storage rate of the electrical storage device 32.

In addition, when it is confirmed that the cell voltage of the fuel cell 10 received from the voltmeter 34 has become equal to or lower than a predetermined voltage value, the fuel cell ECU 13 discontinues the supply of electrical power to the hydrogen circulating pump 19.

However, circulation of hydrogen by the hydrogen circulating pump 19 may be continued for the purpose of preventing defective electrical power generation at the start of resuming the normal electrical power generation in the fuel cell 10 by continuing the circulation of hydrogen so as to allow hydrogen to uniformly reach the cells in the fuel cell 10.

As described above, the fuel cell system 101 according to this embodiment of the present invention includes the fuel cell 10 that generates electrical energy by reacting a hydrogen gas supplied from the hydrogen gas tank 11 and oxygen in air as an oxidizing agent gas supplied from the compressor 12. Moreover, the fuel cell system 101 includes the hydrogen circulating pump 19, which is provided on the hydrogen circulation line 15 for recirculating hydrogen gas not used in the fuel cell 10 to the fuel cell 10 and transfers the hydrogen gas in the hydrogen circulation line 15 to the fuel cell 10, and the fuel cell ECU 13. In the case where the supply of hydrogen gas from the hydrogen gas tank 11 to the fuel cell 10 is discontinued, the fuel cell ECU 13 discontinues the supply of air from the compressor 12 to the fuel cell 10 and activates the hydrogen circulating pump 19 such that the fuel cell ECU 13 supplies electrical energy generated in the fuel cell 10 to the hydrogen circulating pump 19.

In this configuration, since oxygen, which is contained in air remaining in the fuel cell 10 after discontinuing the supply of hydrogen gas to the normally operating fuel cell 10, is consumed by reacting with circulating hydrogen gas, a high electrical potential in the fuel cell 10 is prevented. As a result, without newly using hydrogen gas in the hydrogen gas tank 11, high electrical potential of the fuel cell 10 can be prevented to inhibit deterioration of the catalyst in the cells of the fuel cell 10. Moreover, since electrical energy generated by the reaction between oxygen and hydrogen gas is used to operate the hydrogen circulating pump 19, loss of the generated electrical energy can be reduced enabling the electrical energy to be used effectively. Since the consumption of hydrogen gas is reduced, the duration of the operating time of the fuel cell system 101 each time the hydrogen gas tank 11 is filled with hydrogen gas can be prolonged.

In addition, the fuel cell system 101 includes the electrical storage device 32 capable of storing electrical energy generated from the fuel cell 10. When the electrical power storage rate of the electrical storage device 32 is equal to or less than a predetermined electrical power storage rate, the fuel cell ECU 13 supplies electrical energy generated in the fuel cell 10 to the hydrogen circulating pump 19 as well as the electrical storage device 32. As a result, since, at a minimum, surplus electrical energy that cannot be fully used to operate the hydrogen circulating pump 19 is stored in the electrical storage device 32, loss of electrical energy can be reduced. Moreover, since electrical energy is supplied to the electrical storage device 32 when the electrical power storage rate thereof is equal to or less than a predetermined electrical power storage rate, the electrical power storage rate of the electrical storage device 32 is prevented from reaching full capacity. Also, wasteful expenditures of energy, which are attributable to supplying electrical power to the electrical storage device 32 to full capacity and resulting in electrical energy unable to be stored thereafter being discarded, is inhibited. In addition, if the electrical power storage rate of the electrical storage device 32 has reached full capacity when the normal operation of the fuel cell 10 is resumed, generated surplus electrical energy will end up being lost. However, this wasteful expenditure of energy can also be reduced.

Fuel gas used in the fuel cell system 101 of the embodiment is not limited to hydrogen gas, but rather may also be a gas that contains a reducing agent such as hydrogen.

Moreover, the oxidizing agent gas used in the fuel cell system 101 is not limited to air, but rather may also be a gas that contains an oxidizing agent such as oxygen.

In the embodiment, although the fuel cell system 101 is equipped in a vehicle such as a forklift, it is not limited thereto, but rather can also be equipped in all systems provided with a fuel cell.

What is claimed is:

1. A fuel cell system comprising:
   a fuel cell generating electrical energy by reacting a hydrogen gas supplied from a hydrogen gas supply source and an oxidizing agent gas supplied from an oxidizing agent gas supply source;
   a hydrogen circulating pump provided in a hydrogen circulation path where hydrogen gas that has not been used in the fuel cell is recirculated to the fuel cell, the hydrogen circulating pump transferring hydrogen gas of the hydrogen circulation path to the fuel cell;
   a sensor provided on the hydrogen circulation path, the sensor being configured to sense the supply of hydrogen gas from the hydrogen gas supply; and
   a control means configured to control the supply of oxidizing agent gas from the oxidizing agent gas supply source, to control the hydrogen circulating pump, and to detect the supply of hydrogen gas from the hydrogen gas supply based on information provided by the sensor,
   wherein, as a result of the supply of hydrogen gas from the hydrogen gas supply source to the fuel cell being discontinued, the control means is configured to discontinue the supply of oxidizing agent gas from the oxidizing agent gas supply source to the fuel cell and to activate the hydrogen circulating pump such that the control means supplies electrical energy generated in the fuel cell to the hydrogen circulating pump.

2. The fuel cell system according to claim 1, further comprising an electrical storage device capable of storing electrical energy generated from the fuel cell, wherein the control means also supplies electrical energy generated in the fuel cell to the electrical storage device when an electrical power storage rate of the electrical storage device is equal to or less than a predetermined electrical power storage rate.

3. The fuel cell system according to claim 1, wherein when a cell voltage of the fuel cell exceeds a predetermined voltage value even when an electrical potential of the fuel cell has been lowered by the control means discontinuing the supply of oxidizing gas and activating the hydrogen circulating pump, the control means provides an amount of hydrogen gas to the fuel cell from the hydrogen gas supply source which is smaller than an amount of hydrogen gas supplied to the fuel cell when the fuel cell is operating under an external load.

* * * * *